United States Patent [19]
Kajino

[11] Patent Number: 5,682,234
[45] Date of Patent: Oct. 28, 1997

[54] LENS METER

[75] Inventor: Tadashi Kajino, Okazaki, Japan

[73] Assignee: Nidek Co., Ltd., Gamagori, Japan

[21] Appl. No.: 685,101

[22] Filed: Jul. 22, 1996

[30] Foreign Application Priority Data

Jul. 27, 1995 [JP] Japan .................................. 7-212660
Jul. 31, 1995 [JP] Japan .................................. 7-215430

[51] Int. Cl.$^6$ .................................................. G01B 9/00
[52] U.S. Cl. .................................................. 356/124
[58] Field of Search .................................. 356/124, 125, 356/127

[56] References Cited

U.S. PATENT DOCUMENTS

| | | | |
|---|---|---|---|
| 4,730,924 | 3/1988 | Allard et al. | 356/125 |
| 4,826,315 | 5/1989 | Kobayakawa | 356/125 |
| 5,173,739 | 12/1992 | Kurachi et al. | 356/124 |
| 5,247,341 | 9/1993 | Kurachi et al. | 356/127 |
| 5,349,433 | 9/1994 | Iwane | 356/124 |
| 5,379,111 | 1/1995 | Kajino et al. | 356/124 |
| 5,489,978 | 2/1996 | Okumura et al. | 356/124 |
| 5,521,700 | 5/1996 | Kajino et al. | 356/124 |

FOREIGN PATENT DOCUMENTS

A-60-17335  1/1985  Japan .
A-6-160239  6/1994  Japan .

Primary Examiner—F. L. Evans
Attorney, Agent, or Firm—Oliff & Berridge

[57] ABSTRACT

A lens meter in which a measuring light flux is projected against a lens to be examined and the optical characteristics of the examined lens are measured in reference to the position of an image formed on a light receiving element by the measuring light flux passed through the examined lens, comprises a device changing-over to a mode for measuring an additive diopter of a progressive focus lens, a device for measuring the refractive power of the lens continuously, a device for sensing a reference position having a predetermined optical characteristics of the progressive focus lens, a device for sensing dislocation between each measuring position and the reference position by sensing movement distance of the lens, a device for determining whether the value of the additive diopter obtained on the basis of the measurement by the measuring device is biggest or not, a device for storing the measuring position by the position sensing device when the value of the additive diopter is biggest, and a device for displaying the measuring position when the value of the additive diopter is biggest. In case of that, the lens meter comprises a device for dividing measurement process in the additive diopter measuring mode into plural measurement processes and displaying the respective measurement process, a device for generating a process change signal of respective measurement process divided as above, and a device for indicating the measurement process of the present time among the plural measurement processes.

11 Claims, 6 Drawing Sheets

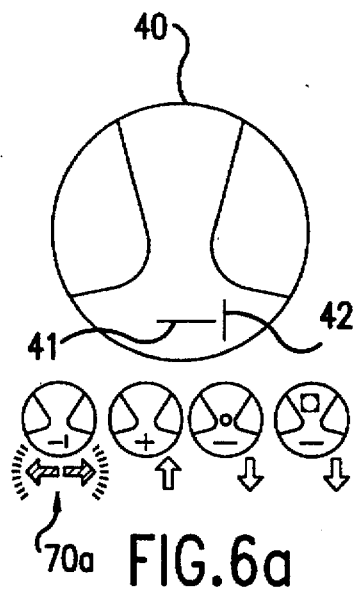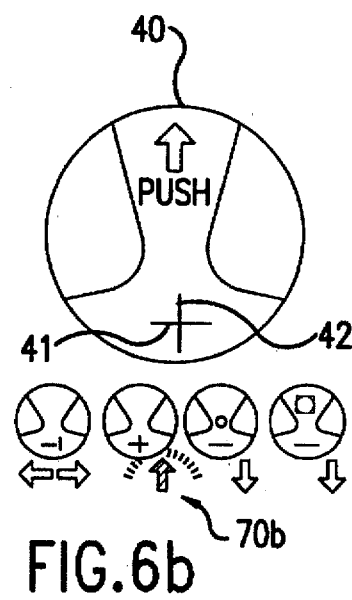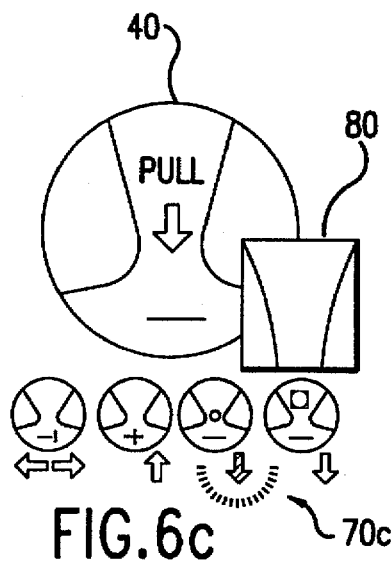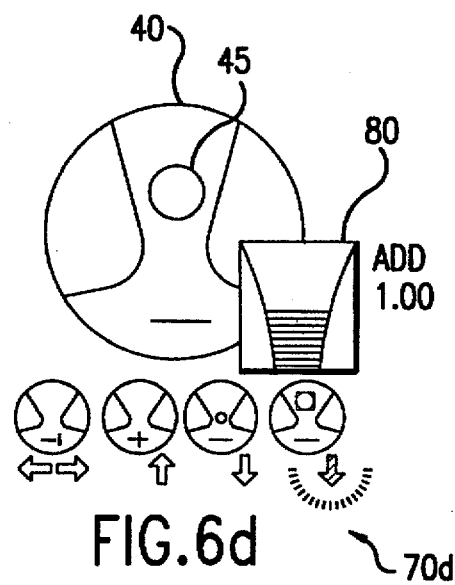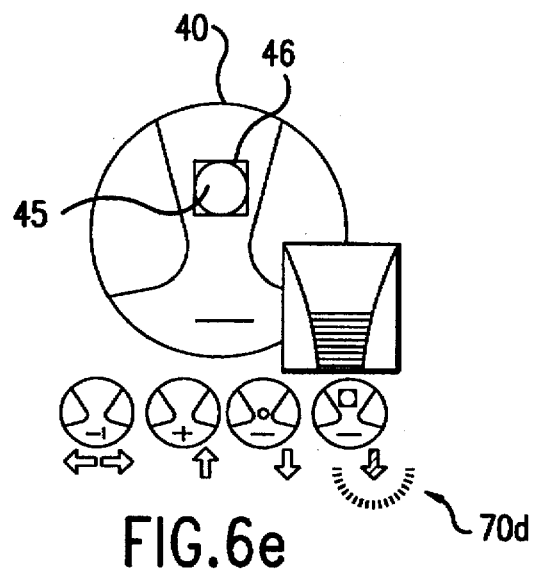

LENS METER

BACKGROUND OF THE INVENTION

1. Field of the Invention

The present invention relates to a lens meter for use in measuring the optical characteristics of a lens, and more particularly a lens meter which is suitable for measuring a progressive focus lens.

2. Description of the Related Art

It is well known a lens meter to provide in which a measuring light flux is projected against the lens to be examined, a locus of measuring light passed through the examined lens is detected by a light receiving element and then the optical characteristics of the examined lens can be obtained in response to the result of detection. This lens meter has an additive diopter measuring mode so as to measure the additive diopter of a progressive multifocus lens and the like.

In case that the additive diopter is to be measured, the examined lens is moved in respect to the measuring optical axis and at first the far viewing section is measured and stored. After this operation, the lens is moved along the progressive section and a position where the operator judges to approach the near viewing section is measured and stored. The additive diopter is calculated in reference to the difference between the measured values.

Meanwhile, the lens not processed before being mounted into a frame is normally applied with marks or concealed marks indicating the respective positions of the far viewing section and the near viewing section, so when the marks indicating the respective positions of the far viewing section and the near viewing section are searched to follow, a relative accurate measurement can be performed. However, in case of the framed lens and the like, these marks are wiped off for cleaning, so the measuring positions of the far viewing section and those of the near viewing section in the lens are determined subjectively by the operator and the correctness of the determination is dependent on the perception and experience of the operator.

On the other hand, in the recent apparatus, there is an apparatus which continuously displays the additive diopter during measurement. By using this apparatus, it is capable of aligning the measuring position with the near viewing section by moving the lens so that the value of the additive diopter may be biggest by seeing the display of the additive diopter. However, even if the operator agrees with the display of the additive diopter, in case the operator is not accustomed to the measurement, the operator does not find out the near viewing section and the like, so it is not easy to guide the measuring position to the near viewing section accurately. Therefore, the reliance of the obtained result of the measurement is not reliable, too.

Additionally, in the recent apparatus, there is an apparatus which informs the operator of the respective position of the far viewing section and the near viewing section, however, even if the operator agrees to the guide mark and the like, in case that the operator does not understand the whole measurement process, the operator happens to loose sight of the step executed at present. In this case, if the operator does over again once more from the initial measurement process, there is a problem of what the measurement takes much time.

SUMMARY OF THE INVENTION

The present invention has been made in view of the above circumstances and has an object to overcome the above problems and it is therefore a first object of the present invention to provide a lens meter capable of being measured efficiently and easily by the unskilled operator even if the respective mark of the far viewing section and the near viewing section of the framed lens is erased, fade out or wiped off.

The another object of the present invention is to provide a lens meter capable of obtaining highly reliable measured data including an additive diopter without necessity to depend on operator's skill.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, a lens meter of this invention in which a measuring light flux is projected against a lens to be examined and the optical characteristics of the examined lens are measured in reference to the position of an image formed on a light receiving element by the measuring light flux passed through the examined lens, comprises a mode changing-over means changing-over to a mode for measuring an additive diopter of a progressive focus lens, a measuring means for measuring the refractive power of the lens to be examined continuously, a reference position sensing means for sensing a reference position having a predetermined optical characteristics of the progressive focus lens, a position sensing means for sensing dislocation between each measuring position and the reference position by sensing movement distance of the lens to be examined, a determining means for determining whether the value of the additive diopter obtained on the basis of the measurement by the measuring means is biggest or not, a storing means for storing the measuring position by the position sensing means when the value of the additive diopter is biggest, and a displaying means for displaying the measuring position when the value of the additive diopter is biggest.

In another aspect of the present invention, a lens meter for projecting measuring light flux on a lens to be examined and for measuring the optical characteristics of a lens to be examined on the basis of the locus of the image formed on a photo-detecting device by measuring light flux transmitted through the lens to be examined, the apparatus comprises a mode changing-over means for selecting a measuring mode to measuring an additive diopter of a progressive focus lens, a process displaying means for dividing measurement process in the additive diopter measuring mode into plural measurement process and displaying the respective measurement process, a change signal generating means for generating a process change signal of respective measurement process divided as above, an indicating means for indicating the measurement process of the present time among the plural measurement process.

According to the present invention, it is capable of aligning the progressive lens for measuring the additive diopter extremely easily even if the mark of the far viewing section or the near viewing section is erased. Therefore, highly reliable measured data can be obtained.

Also, even if the unskilled operator can carry out the lens moving operation with accuracy by perceiving the whole measurement process of the progressive multifocus lens and can measure the additive diopter efficiently and easily.

3

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings:

FIGS. 6(a) through 6(e) are views for illustrating a displayed state of a display under a measuring mode of a progressive focus lens.

DETAILED DESCRIPTION OF THE PREFERRED EMBODIMENTS

A detailed description of one preferred embodiment of a lens meter embodying the present invention will now be given referring to the accompanying drawings.

Figure 1:
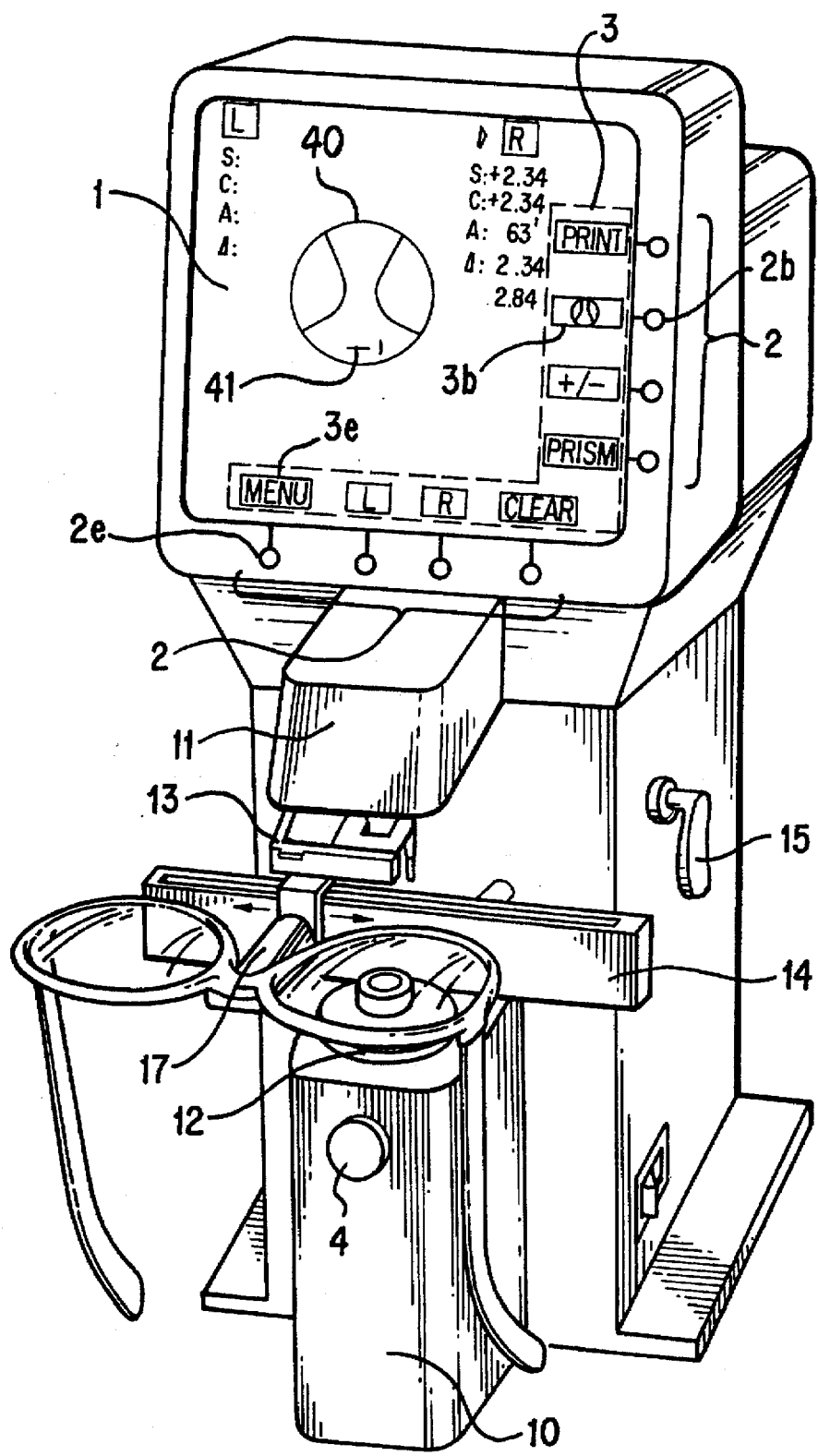
FIG. 1 shows an outer appearance of a lens meter of one preferred embodiment of the present invention.

FIG. 1 shows an outer appearance of a lens meter of the preferred embodiment. Reference numeral 1 denotes a display of LCD and the like for use in displaying various information such as a target, measuring information, a set screen and the like for alignment. Reference numeral 2 denotes a group of switches, wherein a switch corresponding to a switch display 3 displayed at a predetermined position in the display 1 is depressed to enable the device to be operated and various kinds of items to be set. On the switch display 3 at the measuring screen are present various kinds of switch displays such as a right-left selection switch display for selecting each of a right lens or a left lens, a print switch display, a measuring mode changing-over switch display 3b and a menu switch display 3e for setting parameters and the like.

Every time the switch 2b corresponding to the measuring mode change-over switch display 3b is depressed, a mode for measuring a single focus lens and another mode for measuring a progressive focus lens can be selected in sequence and the measuring screen is correspondingly changed over. In addition, when the switch 2e corresponding to the menu switch display 3e is depressed, the contents of the switch display and graphic display of the display 1 can be changed over and then various kinds of settings can be carried out under the operation of the switch group 2.

Reference numeral 4 denotes a READ switch for use in reading and storing measured values.

Reference numerals 10 and 11 denote storing bodies for storing a measuring optical system to be described later, wherein the storing body 10 is provided with a nose piece 12 for mounting a lens and the examined lens is held by lowering a lens fixer 13.

Reference numeral 14 denotes a lens receiver for use in setting a position of the examined lens in its forward or rearward direction, wherein the lens receiver 14 is held in such a manner that it can be moved in a forward or rearward direction in respect to the device. Reference numeral 15 denotes a moving lever for the lens receiver 14.

Reference numeral 17 denotes a nose pad to be abutted against nose pads of a spectacle frame when a framed lens is measured, wherein the nose pad 17 is held in such a manner that it can be moved in the lens receiver 14 in a lateral direction.

Figure 2:
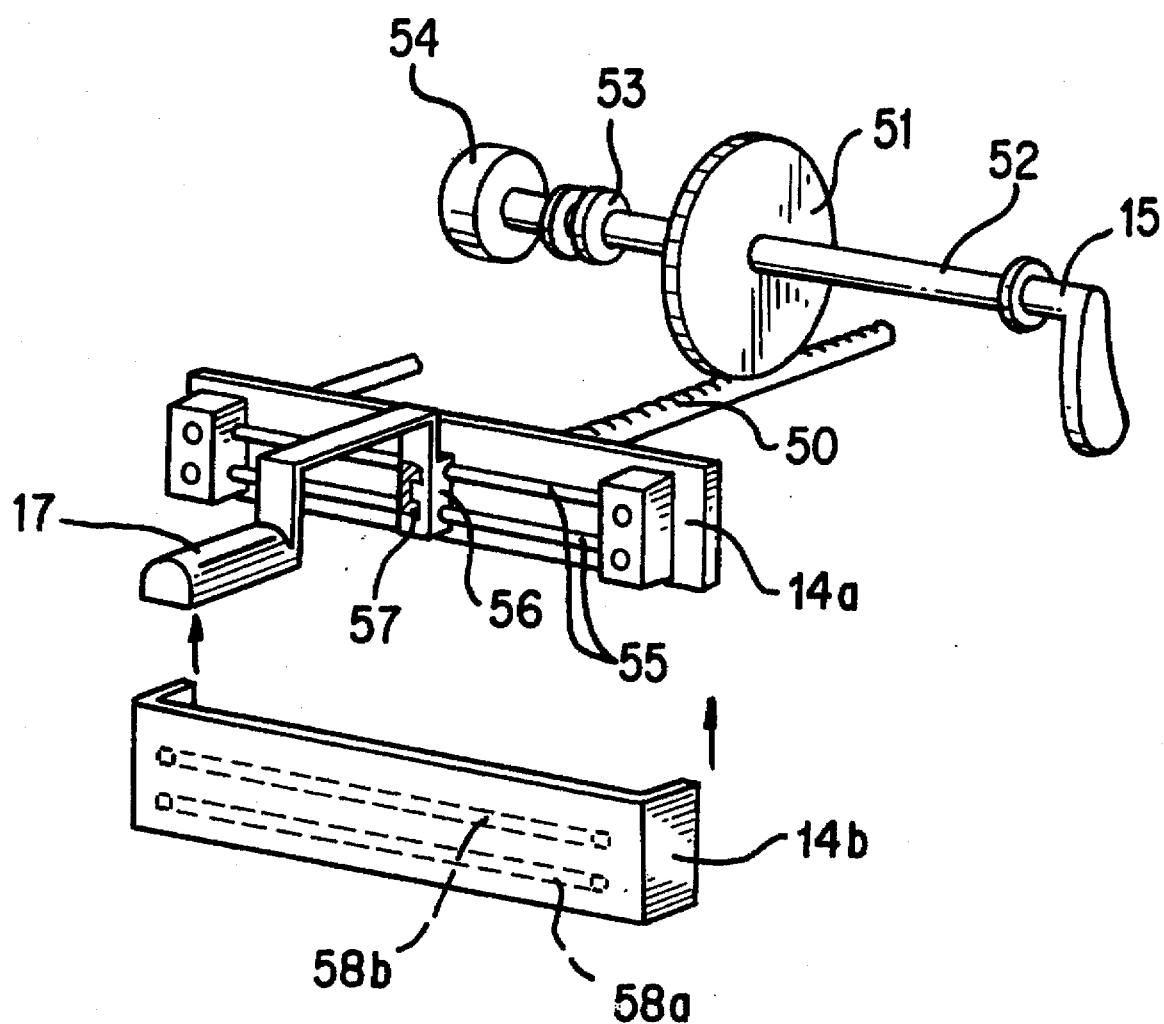
FIG. 2 is a view for illustrating a mechanism for sensing movement positions in the forward or rearward direction and the rightward or leftward direction of a lens to be examined in the lens meter shown in FIG. 1.

FIG. 2 is a view for illustrating a mechanism for sensing the movement positions of the examined lens in the forward or rearward direction and the lateral direction, respectively.

Reference numeral 50 denotes a rack fixed to a rear plate 14a of the lens receiver 14, wherein the rack 50 is held in the device in such a manner that it can be moved in a forward or rearward direction. To the rack 50 is engaged a pinion 51, and a shaft 52 passes through the pinion 51 and fixed there. To one end of the shaft 52 is fixed a moving lever 15 and to the other end of the shaft 52 is fixed a potentiometer 54 through a flexible coupling 53. Upon rotation of the moving lever 15, the rack 50 is moved in a forward or rearward direction together with the lens receiver 14 under the rotation of the pinion 51 and concurrently the rotation is transferred to the potentiometer 54. With such an arrangement as above, an amount of motion of the lens receiver 14 in the forward or rearward direction is detected by the potentiometer 54.

To the lens receiver rear plate 14a are fixed two rails 55 extending in parallel from each other in a lateral direction through fixing members, wherein the nose pad 17 is engaged with a sliding member 56 movable along the rails 55 and integrally held to it. Reference numeral 14b denotes a lens receiver front plate, wherein at the rear surface are held a linear resistor 58a and an electric conductor 58b. To the sliding member 56 is fixed a brush 57, and the lens receiver front plate 14b is fixed to the lens receiver rear plate 14a in such a manner that one arm of the brush 57 is abutted against the linear resistor 58a and the other arm is abutted against the electric conductor 58b. An amount of lateral motion of the nose pad 17 is detected under a variation of voltage by the sliding motion of the brush 57 on the linear resistor 58a.

Figure 3:
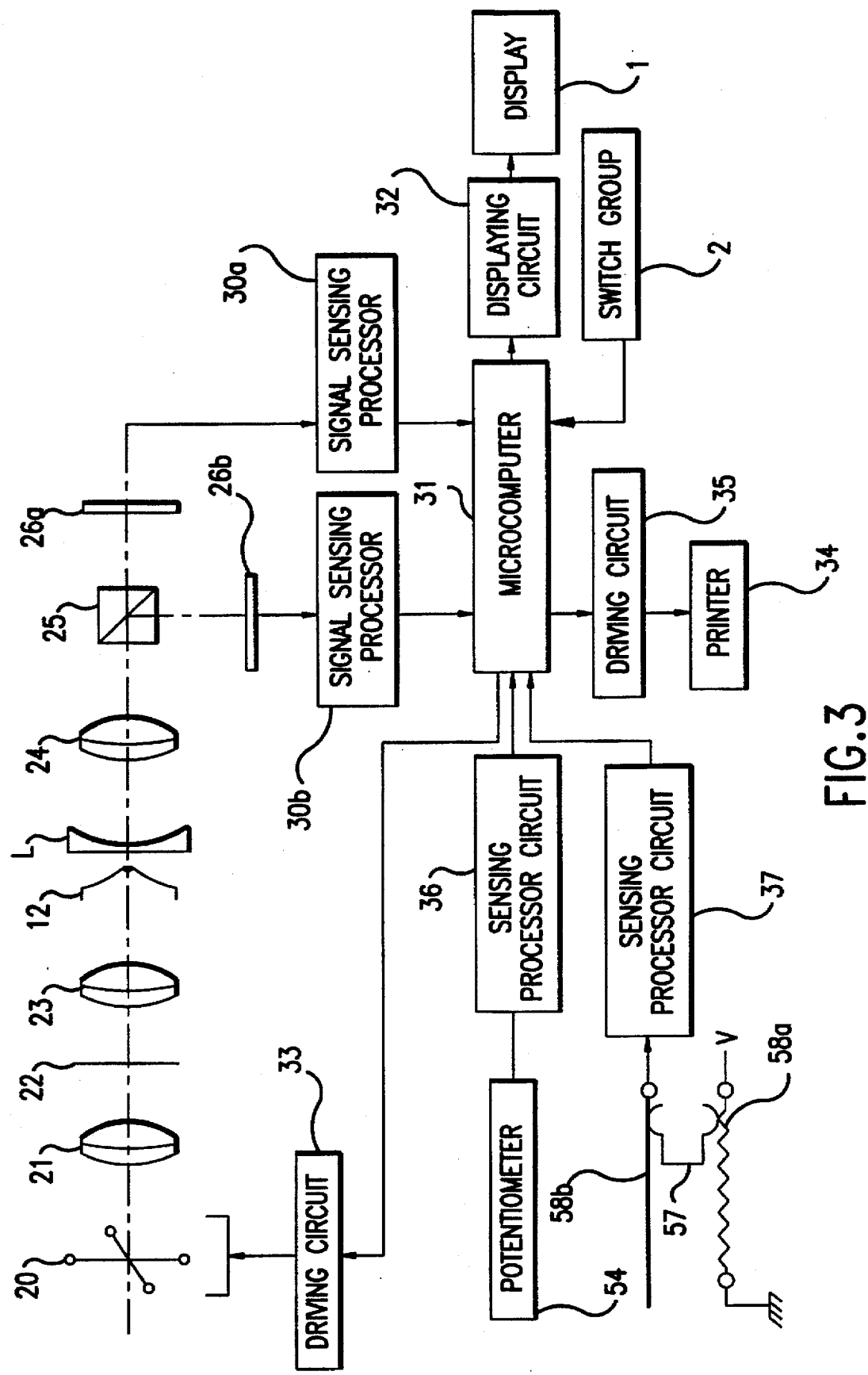
FIG. 3 is a view for illustrating an optical system and a control system of the lens meter of the preferred embodiment.

FIG. 3 is a view for illustrating an optical system and a control system of the lens meter.

Reference numeral 20 denotes measuring light sources for LED and the like, wherein four light sources are arranged near the focal point of a condenser lens 21 while being crossed at a right angle with an optical axis and they are lit up in sequence when the measurement is carried out under control of a microcomputer 31. Reference numeral 22 denotes a measuring target having crossing slits and the target is fixed near the focal point of the condenser lens 21 and a collimating lens 23 or movable. The nose piece is arranged near the focal points of the collimating lens 23 and an image forming lens 24. Reference numeral 25 denotes a half prism, and reference numeral 26a, 26b denotes two one-dimensional image sensors arranged in such a manner that they may be crossed to each other in respect to the optical axis and their sensing directions are crossed to each other.

Light projected from the measuring light sources 20 radiates against the measuring target 22 through the condenser lens 21. Light beam passed through the measuring target 22 is focused on each of the two crossing image sensors 26a, 26b through the collimating lens 23, the examined lens L and the image forming lens 24.

A relation between the refractive power of the examined lens and an image forming position of the measuring target will be described in brief. Each of the measuring light sources 20 is lit in sequence so as to illuminate the measuring target. In the case that the examined lens is not present (or a lens having no refractive power is mounted), all the target images formed on the image sensors 26a, 26b under lit condition of each of the measuring light sources are overlapped from each other. In the case that the examined lens has only a spherical refractive power, a position of the target image on the image sensor 26a, 26b is moved only by the spherical refractive degree. In the case that the examined lens has only a cylindrical refractive power, the light beam incident to the lens may apply a refractive power in such a direction crossing with a major diameter line at a right angle (or in the same direction). Accordingly, it is possible to get a spherical degree, an astigmatism degree, an astigmatism axis angle and a prism amount in response to a central coordinate of the target image formed through lighting of each of the measuring light sources 20. Since this calculation process is basically the same as that disclosed in Japanese patent Laid-Open No. Sho 60-17335 (1985) (with the title of the invention of "Automatic Lens Meter") of the same applicant as that of the present invention, refer to it.

Each of the output signals produced from the image sensors 26a, 26b is processed by a signal sensing processor circuit 30a, 30b, and inputted to the microcomputer 31. The microcomputer 31 applies a predetermined calculating process to get the optical characteristics of the examined lens L.

In addition, a signal on moving information of the lens receiver 14 detected by the potentiometer 54 is processed by a sensing processor circuit 36 and inputted to the microcomputer 31. A voltage signal obtained by sliding the brush 57 on the linear resistor 58a and the electric conductor 58b is processed by the sensing processor circuit 37 and inputted to the microcomputer 31.

Reference numeral 32 denotes a displaying circuit for the display 1 and reference numeral 33 denotes a driving circuit for the measuring light source. Reference numeral 34 denotes a printer and reference numeral 35 denotes its driving circuit.

With such a device having the configuration as described above, its operation will be described as follows. At first, a measuring mode of a single focus lens will be described in brief.

An operator selects a mode for measuring a single focus lens through the switch display 3b and sets a measuring screen to a single focus lens measuring screen.

The microcomputer 31 controls the display circuit 32 and displays a reticle (not shown) of measuring the single focus lens on the display 1. In addition, the microcomputer 31 turns on the four measuring light sources 20 in sequence through the driving circuit 33. When the examined lens having a refractive power is placed on the nose piece 12, its refractive power is calculated and displayed on the display 1, and concurrently an amount of displacement of the examined lens from the optical axis is calculated in reference to the calculated prism value and overlapped on the reticle on the display 1 to display the cross target at a position corresponding to that amount of displacement. The measurement value when the reticle and the cross target have a predetermined relation from each other becomes a measurement value of the examined lens. Upon depression of the READ switch 4, the measurement value is stored.

Then, a measurement of a framed progressive multifocus lens will be described. The operator depresses the switch 2b corresponding to the switch display 3b to select a progressive multifocus lens measuring mode. As shown in FIG. 1, an alignment circle 40 having two curved lines imitating a progressive multifocus lens and a guide 41 are displayed in the screen of the display 1. At both sides of the alignment circle 40 is displayed each of the right and left measurement values, respectively (see FIG. 4(a)).

Switches in the switch group 2 meaning the selection of right and left lenses are depressed to specify the right or left lens in compliance with the lens to be measured. As shown in FIG. 1, the operator causes the lower side of the lens when the spectacles are worn (the upper and lower positions of the frame and the lens expressed in the specification are meant by the upper and lower orientations under a state in which the spectacles are worn by the user) to be abutted against the lens receiver 14 and concurrently the nose pads of the frame to be abutted against the nose pad 17.

Under this condition, the vertical (forward or rearward in respect to the device) and lateral positional movement adjustments of the spectacle frame are carried out together with the lens receiver 14 and the nose pad 17 in such a manner that a slight upper part of the examined lens to be measured may occupy a location on the nose piece 12 and then the measurement is started.

<Measuring step for far viewing>

Figure 4A:
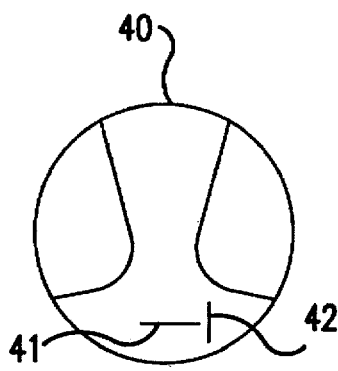
FIGS. 4(a) through 4(f) are views for illustrating a displayed state of a display under a measuring mode of a progressive focus lens.

Upon locating the examined lens on the measuring optical axis, a progressive target 42 is displayed on either the right side or the left side of the guide 41 in the alignment circuit 40 on the screen (FIG. 4(a)). The guide 41 indicates a moving target on a reference ordinate line and the position of the progressive target 42 indicates a direction of which the examined lens should be moved. The microcomputer 31 calculates a relative position of the progressive target 42 in respect to the guide 41 as follows in response to the prism value of each of the measuring points. In the case that the examined lens has only a spherical refractive power, the far viewing section in the lens is positioned on an axis where the prism value may become approximately O, so that the position of the progressive target 42 is controlled through increasing or decreasing of the prism value by lateral motion of the lens. In the case that the examined lens has a cylindrical refractive power, the position where the prism value of the examined lens in the lateral direction becomes O is placed on an astigmatism axis, so that an influence caused by the cylindrical refractive power from the prism values at each of the measuring points is corrected by applying a predetermined calculating process so as to perform control over the position of the progressive target 42. As for the correcting process of influence caused by the cylindrical surface refractive power, the description of Japanese patent Laid-Open No. Hei 6-58842 (1994) (with the title of the invention of "Lens Meter and Its Measuring Method") of the same applicant as that of the present invention of U.S. Pat. No. 5,379,111 of "LENS METER" is applied.

Figure 4B:
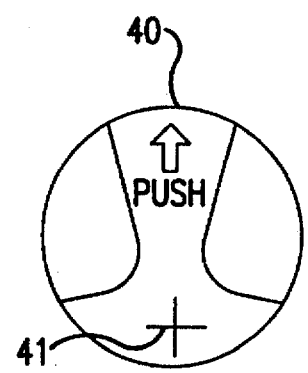

The operator moves the lens in the lateral direction in such a manner that the progressive target 42 may approach the center of the guide 41 (this indicates that in FIG. 4(a), the lens is moved in the leftward direction toward the device). When the center of the progressive target 42 is in compliance with the guide 41, a guidance display mark of "PUSH ↑" meaning that the lens is moved toward a deep side in the alignment circle 40 appears (FIG. 4(b)).

The operator moves the lens receiver 14 toward the deep side of the device together with the lens in accordance with the guidance display. The device gets measurement values continuously in a predetermined interval, and with no variation in the additive diopter (spherical degree) upon movement, deletes "PUSH ↑" on the screen, displays the guide 41 in a large cross shape and informs the operator that the measuring point is placed at the far viewing section. Subsequently, upon stabilization of the measurement value for a predetermined period of time (1 second, for example), the device automatically reads in the measurement value at this time and stores it.

<Measuring step for near viewing>

Figure 4C:
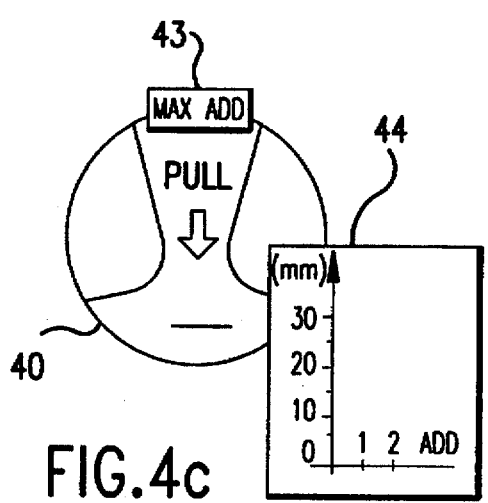

Upon storing the measurement values at the far viewing section, an operation of the device is automatically transferred to a measuring step for the near viewing section. On the screen are displayed a guidance display mark of "PULL ↓" meaning that the lens should be moved toward the operator, a displaying part 43 displaying the maximum value of the additive diopter at the upper part of the alignment circle 40 and an additive diopter graph 44 indicating a state of increasing the additive diopter (FIG. 4(c)). The additive diopter graph 44 has an additive diopter at an abscissa and a distance from an additive diopter starting position at an ordinate.

The operator moves gradually the lens receiver 14 toward the operator together with the lens in accordance with the guidance display. During motion of the lens, the device gets measurement values in a consecutive manner and detects an additive diopter starting position from the variation in additive diopter per unit movement amount. The apparatus decides the reference position of front or behind direction based on the position signal of the potentiometer 54 at the additive diopter starting position. It is not mentioned in this preferred embodiment, but it is capable of obtaining a displacement of leftward or rightward direction based on the voltage of a linear resistor 58a by placing the reference position of leftward or rightward direction on the reference longitudinal axis.

Figure 4D:
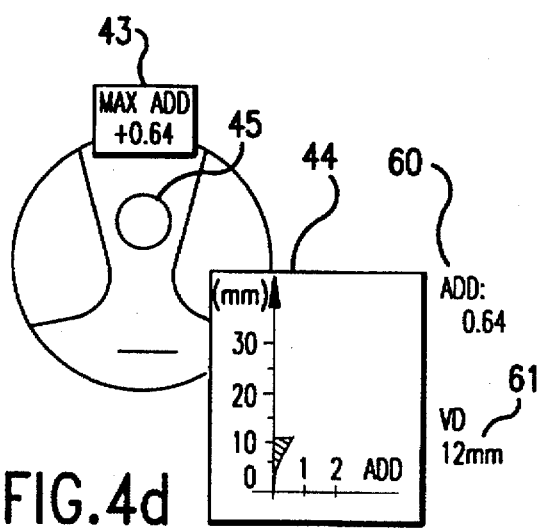

Upon entering of the measuring point in the progressive section, the guidance display of "PULL ↓" disappears, and a corona target 45 appears (FIG. 4(d)). The operator moves the lens and the lens receiver 14 toward the near viewing section. Upon passing of the lens through the progressive section, the corona target 45 moves upward on the alignment circle 40. The movement of the corona target 45 is sensed on the basis of that the lens receiver 14 moves toward this side, and display position is desired based on its sensed movement dislocation. In addition, the device detects the variation in the astigmatism degree and monitors such that the measuring point may not be shifted at the right and left sides of the progressive section. Upon displacement of the point from the progressive section, the corona target 45 is displayed at a position slightly displaced out of the curved line of the progressive section. Upon displacement of the corona target 45 out of the curved line of the progressive section, the operator corrects the movement in the lateral direction.

And also, the apparatus obtains the additive diopter by calculating difference between measured spherical power and the spherical power of the far viewing section. On the displaying part 43, the maximum value of additive diopter till then is displayed and the increase is displayed by the additive diopter graph 44. Whether the additive diopter is the biggest or not is decided according to whether the additive diopter per unit movement distance increases or not, and when the additive diopter increases, the display of the additive diopter of the displaying part 43 is renewed. At the side of the additive diopter graph 44, an additive display 60 which indicates the additive diopter of the measuring point and a distance display 61 which indicates its distance by numerical value.

Figure 4E:
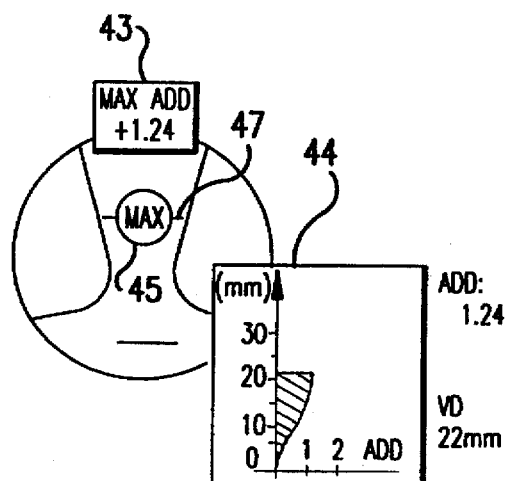

When the additive diopter per unit measurement distance does not increase, the maximum value of additive diopter is kept displaying at the displaying part 43. And according to the movement obtained by the potentiometer 54, the apparatus stores the position of the measuring point where the maximum value of additive diopter is obtained and displays a MAX bar 47 at the position equivalent to its position (FIG. 4(e)). Therefore, even if the measuring point passes through the position of the maximum value of additive diopter, by restoring repeatedly the corona target 45 to a position of MAX bar 47, it is capable of aligning the measuring point with the position of the maximum value of additive diopter (namely it is the near viewing position) and capable of doing over again accurately.

Figure 4F:
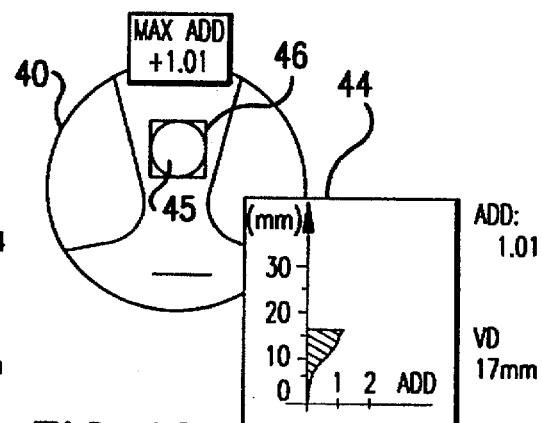

In case that the display signal of the MAX bar 47 is not obtained even if the measuring point reaches to the position where is the predetermining distance (the near viewing section of a general progressive multifocus lens is about 16 mm from the additive diopter starting position) from the additive diopter starting position, the sign of the near viewing section 46 is displayed around the corona target 45 (FIG. 4(f)). The reason why of this will be described, that is to say, within lens, its additive diopter is kept increasing to the edge of the lens, so the maximum value of additive diopter of its lens does not exist in the near viewing section determined by the lens maker, and the method dealing with the maximum value of additive diopter, which described above, as an additive diopter of the lens to be examined can not be used. In the case of that the MAX bar 47 is not come in sight, the operator aligns referring to this sign of the near viewing section 46 and the distance display 61, and the operator pushes the READ switch 4 and measures the near viewing section. In case that the additive diopter per unit movement distance does not increase and the MAX bar 47 should be displayed, even if a display signal of the sign of the near viewing section 46 is obtained once, the sign of the near viewing section 46 is erased (if it is not obstructive, it may be kept displaying). Besides, the appearance position of the sign of the near viewing section is variable by using the menu setting switch of the apparatus.

The present invention may be embodied in other specific forms by a person having ordinary skill in the art, for example, an additive diopter starting position, a measuring position of the far viewing position and the like can be applied as the reference position.

Figure 5:
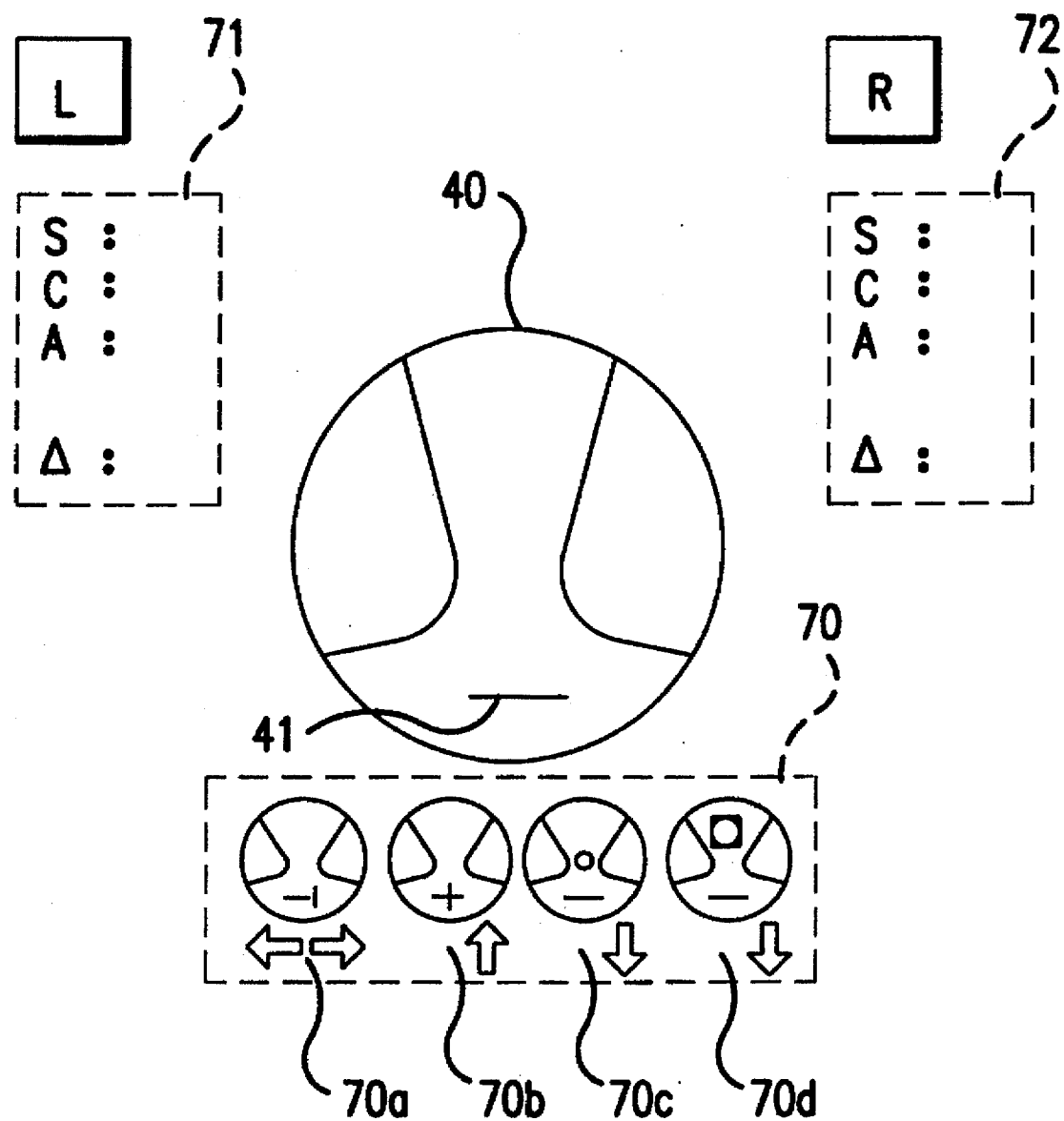
FIG. 5 is a view of an example of the display on condition that the lens meter to be examined is not put on the nose piece according to the second preferred embodiment of the lens meter.

In the second embodiment of the present invention, the general configuration, the optical system and the control system are basically same as the first embodiment of the present invention, therefore the description of the second embodiment is shortened. Hereinafter, the operation which displays the respective process for dividing the measurement process of the progressive focus lens measuring mode into plural measurement process will be described referring to FIGS. 5 and 6. Besides, as for the same elements with the first embodiment of the present invention, the same reference numeral is used to describe. The operator select a progressive multifocus lens measuring mode by pressing a switch 2b. Before a lens is put on the nose piece 12, as shown FIG. 5 (figure of the switch display 3 is omitted), an alignment circle 40 including two curves like a progressive lens and a guide 41 are displayed at a display 1. At the lower side of the display 1, the four illustrations 70 of measurement process, which are symbolized measurement process of measuring the progressive multifocus lens (description of respective process will be described below), are displayed. At parts of reference numeral 71, 72 in FIG. 5, the both of left and right measured data are displayed.

Either the right lens selector button or the left lens selector button in the switch group 2 is depressed to specify a lens to be tested. The position of the lens L is adjusted so that a lower side of the spectacle frame may be contact with the lens receiver 14, and the lens L is positioned on the nose piece 12, and then the measurement is started.

(A) The first measurement process

The first measurement process is for moving the far viewing section onto the longitudinal axis line through optical center of lens. When the lens L is positioned on the measurement optical axis, a progressive target 42 is displayed at either left or right end of the guide 41 (which see FIG. 6(a)). The guide 41 designates the moving target on the reference longitudinal axis line, and the position of progressive target 42 designates the direction of the lens L where the lens should be moved. At this time, the display of arrow post turning toward leftward or rightward direction of a measurement process illustration 70a goes on and off repeatedly, and this display of going on and off indicates that the process is the first measurement process for moving the lens L to leftward or rightward direction.

The microcomputer 31 calculates the relative position against the guide 41 according to the prism value at each measuring point similar to the first preferred embodiment.

The operator moves the lens L to the leftward or rightward direction so that the progressive target 42 may be at the center of the guide 41 (FIG. 6(a) indicates that the movement to leftward direction of the lens L against the apparatus).

[B] The second measurement process

The second measurement process is for sensing the far viewing section on the reference longitudinal axis line, and is for measuring/storing the far viewing section.

When the center of the progressive target 42 is overlapped with the guide 41, the guide display mark of "PUSH ↑" comes in sight (see FIG. 6(b)). At this time, in the four illustrations 70 of measurement process, the arrow post which is under the reference numeral 70b starts going on and off, and this display of going on and off informs the operator that the process is the second measurement process.

The operator moves the lens L the inner part against the apparatus according to the guide display. The apparatus continuously obtains the measurement data every predetermined distance, if the additive diopter is not changed by the movement, it erases the "PUSH ↑" on the display and it makes shape of a guide 41 to a big-cross display, and it informs the operator that the measuring point is in the far viewing section. After that, measurement data is stable for a while (for example about one second or predetermining time), the data is sensed and stored by the apparatus.

[C] The third measurement process

The third measurement process is for guiding the measuring point to the progressive section. When the apparatus stores the measurement data of the far viewing section, the additive diopter measuring step starts automatically. In the alignment circle 40, the guide display mark of "PULL ↓" which means that moving the lens L toward the operator, and at the right-lower side of the alignment circle 40, the additive diopter graph 80 comes in sight (which see FIG. 6(c)). In the four illustrations 70 of measurement process, the arrow post which is under the reference numeral 70c starts going on and off, and this display of going on and off informs the operator that the process is the third measurement process. The operator moves the lens receiver 14 and the lens L toward the operator according to the guide display.

During the movement of the lens L, the apparatus continuously obtains the measurement data, and it senses the movement distance of the lens receiver 14 by the potentiometer 54 (also, the prism quantity of the lens L can be convert into the movement distance), and senses the additive diopter starting position based on the variation in additive diopter per unit movement distance. Furthermore, whether the additive diopter which is more than predetermined value (for example, it is 0.4 D) is obtained or not, is decided. And in case that the additive diopter is obtained, it is confirmed that the measuring point is in the progressive section (the additive diopter is generally more than 0.5 D, so the measuring point can be in the progressive section certainly by sensing the additive diopter which value is about 0.5 D).

[D] The fourth measurement process

The fourth measurement process is for obtaining the additive diopter.

The measurement point moves to the progressive section, and when the movement is confirmed, the display of "PULL ↓" is erased and the corona target 45 comes in sight. At this time, in the four illustrations 70 of measurement process, the arrow post which is under the reference numeral 70d starts going on and off, and this display of going on and off informs the operator that the process is the fourth measurement process.

The operator pulls the lens L toward the operator so that the near viewing section is at the measuring position. Then the lens L moves through the progressive section, and the corona target 45 moves to upper part on the alignment circle 40. The movement of the corona target 45 is accomplished based on the movement distance sensed by the potentiometer 54 (simply, the variation of the prism quantity can be converted into the movement distance of the lend L, but in case of the low power lens, the measurement aberration is bigger, therefore it is better to sense the movement distance of the lens L directly). During the lens L is moving, the apparatus accomplishes the measurement continuously, displays the additive diopter at the display and also displays the increase at the additive diopter graph 80. Also, the apparatus senses the variation of astigmatism power and keeps watch on the measuring position so that the measuring position may not be outside of the progressive section.

The operator pulls the lens L furthermore, and senses the near viewing section. At near the near viewing section, the sign of near viewing section 46 around the corona target 45 which is moving (which see FIG. 6(e)). This sign of near viewing section displays when the measuring point reaches to the position where is predetermining distance from the additive diopter starting position. This predetermined distance is about 16 mm in preferred embodiment of the apparatus. The reason why of "16 mm" is that the position of near viewing section of progressive lens is not fixed caused by variable kinds of lens, but general progressive multifocus lens is set at position where is about 16 mm distance from the additive diopter starting position. The distance is simply calculated based on the movement distance of the lens receiver 14 or the variation of the prism quantity. Besides, it is possible that the operator can change the position where the sign of near viewing section comes in sight from the additive diopter starting position by pressing the menu setting switch which is suitable for the kind of lens of the apparatus. Also, in case that the maximum additive diopter that is, the position of the near viewing section is obtained by the measurement result on measuring continuously before the measuring point reaches the predetermined distance, it is possible to display a sign of a near viewing section 46 at the position.

When the additive diopter is the biggest and stable within the limits of the sign of near viewing section 46 displayed, the operator presses the READ switch 4. The apparatus stores the additive diopter obtained at this time.

As described above, when the operator measures the progressive multifocus lens, the whole process of measurement and the current measurement process is displayed, so the operator can comprehend the whole measurement order, and recognize the measurement step which is done during the measurement, and the operator can do next step without hesitating. Even if the operator makes a mistake, it is capable of doing over again immediately from the mistake process by complying with the measurement process display. Also, since the measurement process is displayed as a design illustration, it is easy to recognize visually.

Furthermore, in respective measurement process, the direction of the lens movement is displayed, therefore if the operator is not accustomed to the measurement, the operator can measure easily.

Besides, in the progressive focus measurement mode, in case of the skillful operator and the like, when the four illustrations 70 of the measurement process is not need, it is possible to select the display by using the setting frame.

The forgoing description of the preferred embodiment of the invention has been presented for purposes of illustration and description. It is not intended to be exhaustive or to limit the variations to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A lens meter in which a measuring light flux is projected against a lens and optical characteristics of the lens are measured in reference to a position of an image formed on a light receiving element by the measuring light flux passed through the lens, comprising:

measuring means for continuously measuring a refractive power of the lens;

reference position sensing means for sensing a reference position having predetermined optical characteristics of the lens;

position sensing means for sensing a displacement of a measuring position from said reference position by sensing movement distance of the lens determining means for determining whether a value of an additive diopter obtained on the basis of the measurement by said measuring means is a maximum value;

storing means for storing the measuring position where the value of the additive diopter is a maximum value and for temporarily storing a current measuring position; and displaying means for displaying the measuring position when the value of the additive diopter is a maximum value.

2. A lens meter according to claim 1, wherein said displaying means displays a the first mark at the measuring position when the value of the additive diopter is a maximum, and furthermore, said displaying means displays a second mark at the displacement position by said position sensing means.

3. A lens meter according to claim 1, wherein said position sensing means includes first position sensing means for sensing movement distance along a first direction of the lens; to and second position sensing means for sensing movement distance along a second direction of the lens the second direction being perpendicular to the first direction.

4. A lens meter according to claim 1, further comprises displaying means for displaying a mark which indicates that movement distance of the lens is a predetermined distance from said reference position.

5. A lens meter according to claim 4, further comprises change means for changing the predetermined from said reference position.

6. A lens meter capable of measuring an additive diopter of a lens in which a measuring light flux is projected against the lens and optical characteristics of the lens are measured in reference to a position of an image formed on a light receiving element by the measuring light flux passed through the lens, comprising:

measuring means for continuously measuring a refractive power of the lens;

reference position sensing means for sensing a reference position having predetermined optical characteristics of the lens;

position sensing means for sensing a displacement of a measuring position from said reference position by sensing movement distance of the lens;

determining means for determining whether a value of an additive diopter obtained on the basis of the measurement by said measuring means is a maximum value;

storing means for storing the measuring position by said position sensing means when the value of the additive diopter is a maximum value;

displaying means for displaying the measuring position when the value of the additive diopter is a maximum value;

process displaying means for dividing a measurement process into a plurality of measurement process steps and displaying the respective measurement process steps;

change signal generating means for generating a process change signal corresponding to a respective measurement process step; and indicating means for indicating a current measurement process step among the plurality of measurement process steps.

7. A lens meter according to claim 6, wherein said process displaying means includes movement direction displaying means for displaying the direction where the lens to be examined should move every respective measurement process.

8. A lens meter according to claim 6, wherein said plurality of measurement process steps includes:

a first process for moving, when the lens does not contain astigmatism correction, a measuring point onto a longitudinal axis line where a prismatic power in a first direction is substantially zero and for moving, when the lens contains astigmatism correction, the measuring point onto the longitudinal axis line where the prismatic power in the first direction is zero after removal of a prismatic variation due to the astigmatism correction;

second process for obtaining the refractive degree of a far viewing section by guiding the measuring point along the longitudinal axis line of the lens;

a third process for guiding the measuring point, which is guided to the far viewing section in said second process, to a progressive section of the lens; and a fourth process for guiding the measuring point to a near viewing section after said third process.

9. A lens meter in which a measuring light flux is projected against a lens and optical characteristics of the lens are measured in reference to a position of an image formed on a light receiving element by the measuring light flux passed through the lens, comprising:

process displaying means for dividing a measurement process in an additive diopter measuring mode into a plurality of measurement process steps and displaying the respective measurement process steps;

change signal generating means for generating a process change signal corresponding to a respective measurement process step; and indicating means for indicating a current measurement process step among the plurality of measurement process steps.

10. A lens meter according to claim 9, wherein said process displaying means includes movement direction displaying means for displaying a direction where the lens should move after the current respective measurement process step.

11. A lens meter according to claim 9, wherein said plurality of measurement process steps includes:

a first process for moving, when the lens does not contain astigmatism correction, a measuring point onto a longitudinal axis line where a prismatic power in a first direction is substantially zero and for moving, when the lens contains astigmatism correction, the measuring point onto the longitudinal axis line where the prismatic power in the first direction is zero after removal of a prismatic variation due to the astigmatism correction;

a second process for obtaining the refractive index of a far viewing section by guiding the measuring point along the longitudinal axis line of the lens;

a third process for guiding the measuring point, which is guided to the far viewing section in said second process, to a progressive section of the lens; and a fourth process for guiding the measuring point to a near viewing section after said third process.

* * * * *